B. M. KENT.
WEIGHING SCALE.
APPLICATION FILED AUG. 4, 1911.
1,064,971.
Patented June 17, 1913.
3 SHEETS—SHEET 3.
Fig. 3.
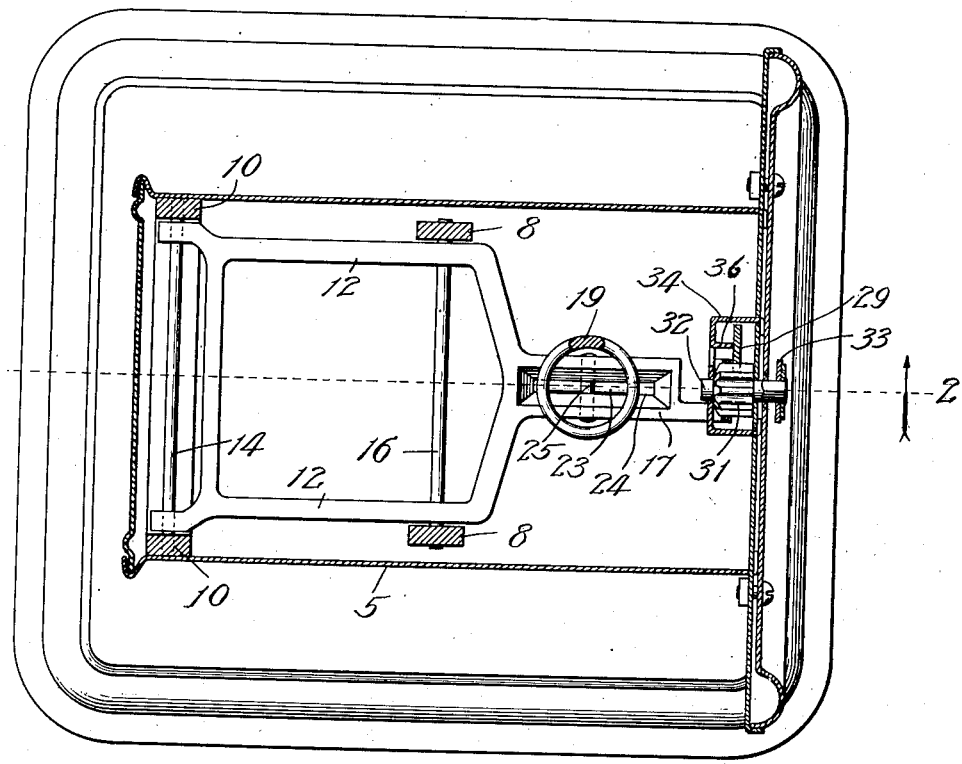
Fig. 4.
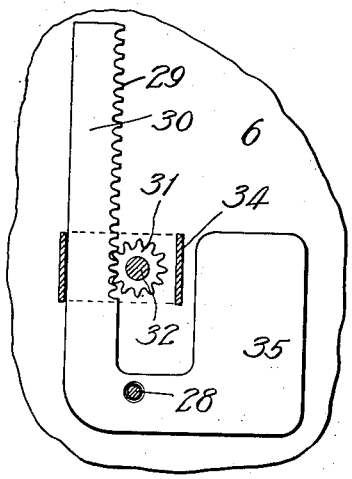
Fig. 4ª
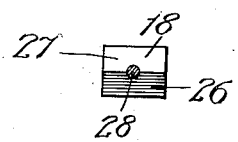
Witnesses:
Inventor:
Burton M. Kent.
By Dyrenforth, Lee, Chritton & Wiles
Att'ys.

UNITED STATES PATENT OFFICE.

BURTON M. KENT, OF CHICAGO, ILLINOIS, ASSIGNOR TO AMERICAN CUTLERY COMPANY, OF CHICAGO, ILLINOIS, A CORPORATION OF ILLINOIS.

WEIGHING-SCALE.

1,064,971.   Specification of Letters Patent.   Patented June 17, 1913.

Application filed August 4, 1911. Serial No. 642,345.

*To all whom it may concern:*

Be it known that I, BURTON M. KENT, a citizen of the United States, residing at Chicago, in the county of Cook and State of Illinois, have invented a new and useful Improvement in Weighing-Scales, of which the following is a specification.

My invention relates more particularly to weighing-scales of the spring - controlled type; and my object is to provide a scale of the type referred to which will be of simple construction and which will operate to accurately weigh articles regardless of the position in which they are placed on the weighing platform.

Figure 1:
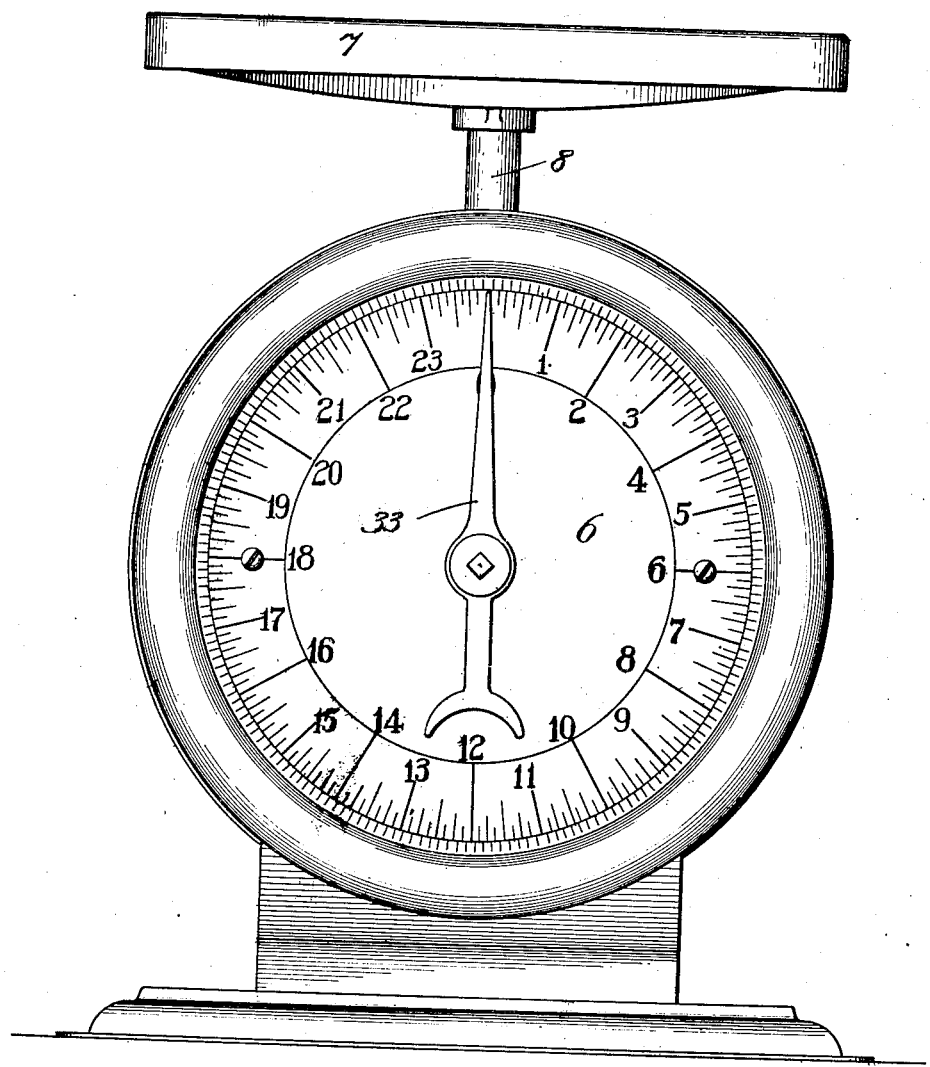
Figure 2:
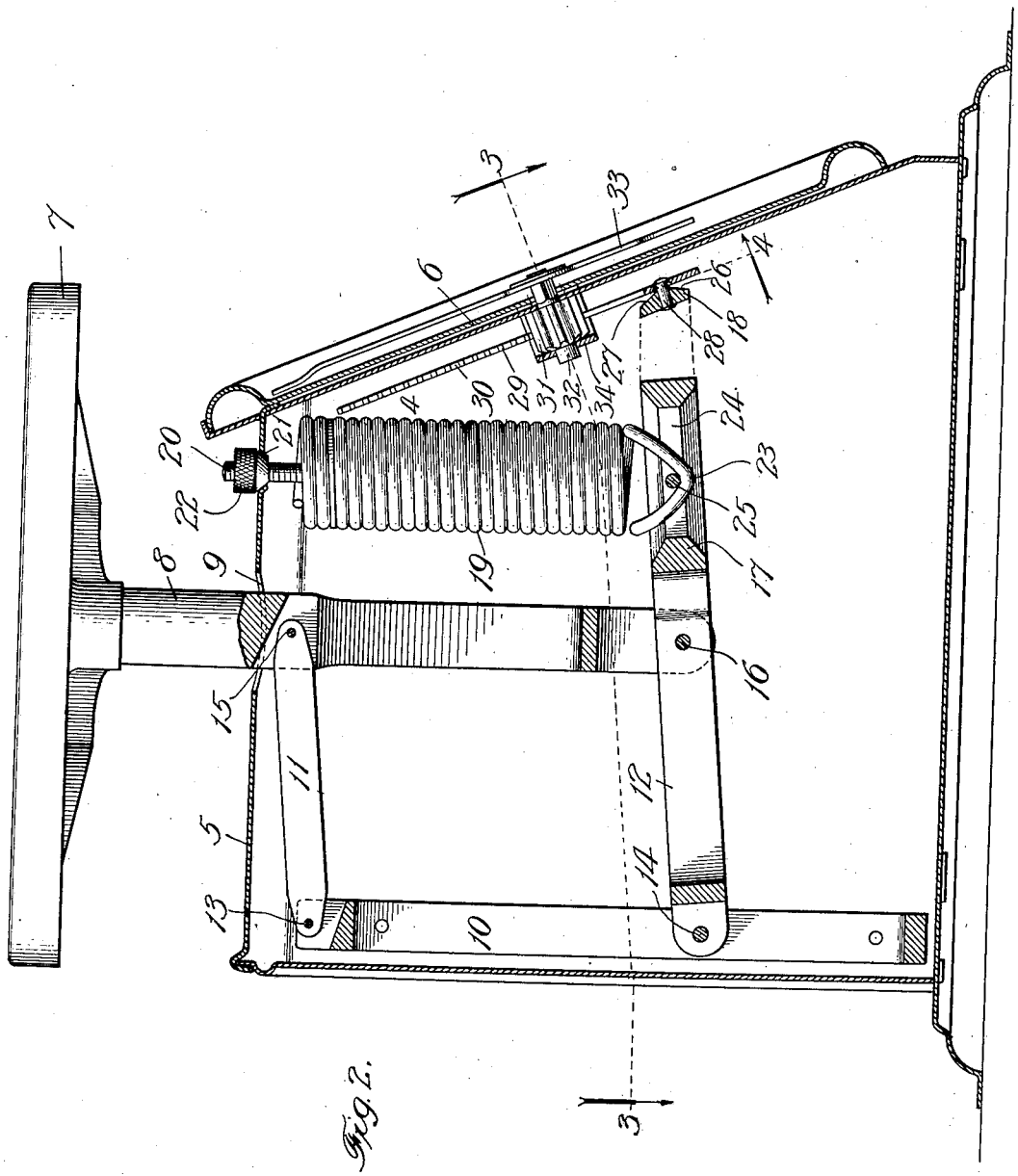

Referring to the accompanying drawings,—Figure 1 is a front view of a spring-scale of the slanting dial type constructed in accordance with my invention. Fig. 2 is a section taken at the line 2 on Fig. 3 and viewed in the direction of the arrow. Fig. 3 is a section taken at the irregular line 3 on Fig. 2 and viewed in the direction of the arrow. Fig. 4 is a broken, enlarged, section taken at the line 4 on Fig. 2 and viewed in the direction of the arrow; and Fig. 4ª, a section taken at the line 4 on Fig. 2 but viewed in the direction opposite to the arrow.

The casing of the scale is represented at 5 and is provided at its front end with a slanting dial 6 such as is usually provided in constructions of this character. The platform which serves as a support for the articles to be weighed is represented at 7 and is carried on the upper end of a vertically reciprocable standard 8 which extends through an opening 9 in the top of the casing, and is of yoke-shape at its lower end. Secured in the casing 5 at the back end thereof is a vertically disposed frame 10 which forms a support for a pair of forwardly extending levers 11 and 12, which are pivoted thereto at their rear ends, as indicated at 13 and 14 respectively, these levers having pivotal connections, as indicated at 15 and 16 respectively, with the standard 8 at the forward extremity of the lever 11 and intermediate the ends of the lever 12. The lever 12 at its rear end, at which it is connected with the frame 10 and standard 8, is in the form of a frame, the forward end of this lever being a bar section 17 which terminates in a plate section 18. The spring for yieldingly holding the platform 7 in raised position is represented at 19, this spring being provided at its upper end with a threaded extension 20 which passes through an opening 21 in the top of the casing 5 and engages with an adjusting-nut 22 which seats against the top of the casing and is provided for permitting regulation of the spring. The lower end of the spring 19 is provided with a hook 23 which lies within a longitudinally-extending slot 24 in the bar section 17 of the lever 12 and extends into engagement with a pin 25 secured in the walls of this slot. It will be manifest from the foregoing description that the spring 19, by being connected with the lever 12, serves to yieldingly maintain the platform 7 in raised position.

The face of the extension 18 is beveled in opposite directions as indicated at 26 and 27 and carries a stud 28 located at the intersection of these beveled surfaces. Journaled on the stud 28 is an upwardly extending rack-bar 29 provided with teeth 30 which engage with a pinion 31 fixed on the shaft 32 carrying a pointer 33. The inner end of the shaft 32 is journaled in a strap-plate 34 secured to the rear face of the dial 6, the tooth portion of the rack 29 lying within this strap section. The rack 29 is provided with a lateral weighted extension 35 and the point at which this rack is pivoted on the stud 28 is such, as represented, as to cause the teeth of the rack 29 to be maintained in mesh with the pinion 31 at all times.

The opening in the rack 29 through which the pin 28 extends is countersunk on its rear side, as represented, the pin 28 fitting loosely in this opening. This feature of the construction, in connection with the beveled faces of the plate extension 18, permits of a relative rocking movement of the rack on the lever 12 during the movements of these parts in the weighing operation, thus preventing the binding of the rack with the pinion. The pivotal connection of the rack 29 with the lever 12 and the connection of the spring 19 with this lever extend medially of the standard 8, and of the pivotal connections of the lever 12 with the frame 10, and this feature of the construction, combined with that of connecting the spring with the lower lever 12, serves to prevent any rocking movement of the standard 8, produced because of lost motion in the joints of the mechanism, by placing an article in a non-central position on the platform, from being communicated to the rack 29, and thus the correct weight of the articles is recorded on the dial regardless of the position in which they are placed on the platform.

The lower end of the spring 19 and the slot 24 are so proportioned that while the spring may work on the pin 25, it will not turn axially in the operation of varying its tension.

The rack 29, in the construction illustrated, tends to tilt rearwardly, toward the spring 19, and to guide the rack without producing objectionable resistance to its movement, I provide a bearing 36, Fig. 3, in the strap-section 34, against which the rack moves in the operation of the scale, this bearing being preferably in the form of a lug cut from the strap 34 and bent inwardly as represented and having a rounded bearing face.

What I claim as new and desire to secure by Letters Patent is—

1. In a weighing-scale, the combination of a casing provided with a dial, a support for the article to be weighed formed at its lower end with spaced members, pivotally-supported lever-mechanism in said casing formed of a single upper link pivotally connected with said casing and with said support, and a lower link formed at its rear portion with spaced members, said lower link being pivoted at its spaced members to said casing and pivotally connected at its spaced members with the spaced members of said support, a coiled spring connected at its upper end with said casing, and at its lower end with said lower link between said support and said dial, and means pivotally connected with the forward end of said lower link, for moving the indicator for indicating on said dial the weight of the article on said support.

2. In a weighing scale, the combination of a casing provided with a dial, a support for the article to be weighed formed at its lower end with spaced members, pivotally-supported lever-mechanism in said casing formed of a single upper link pivotaly connected with said casing and with said support medially of the said spaced members of the support, and a lower link formed of a frame-section at its rear end, affording spaced members, and a bar-section at its forward end extending centrally of said frame-section, said lower link being pivoted at its rear end to said casing at its spaced members and pivotally connected at its spaced members intermediate its ends with the spaced members of said support, a coiled spring connected at its upper end with said casing and at its lower end with the bar-section of said lower link medially of the spaced members of the latter and between said support and said dial, and means operatively connected with the forward end of said bar-section, for indicating on said dial the weight of the article on said support.

3. In a weighing-scale, the combination of a casing provided with a dial, a support for the article to be weighed, lever-mechanism pivoted on said casing and having pivotal connection with said support, means for yieldingly holding said support and lever-mechanism in raised position, a shaft, a pinion and pointer on said shaft, a rack pivoted loosely to said lever-mechanism to permit said rack to tilt on said lever-mechanism forwardly, backwardly and sidewise and engaging with said pinion, and means tending to rock said rack on its pivot toward said pinion to hold the rack in engagement with said pinion throughout the movements of said rack, for the purpose set forth.

4. In a spring-scale, the combination of a supporting member, lever-mechanism pivoted on said member, a support for the articles to be weighed pivoted to said lever-mechanism, means for yieldingly holding said lever-mechanism and support in raised position, a dial, a shaft, a pinion and pointer on said shaft, a rack pivoted loosely to said lever-mechanism to permit said rack to tilt on said lever mechanism forwardly, backwardly and sidewise and meshing with said pinion and supported to normally tilt rearwardly, a guide-member against which said rack bears in its movements, said rack being weighted at the side thereof relative to its pivot, opposite to that carrying the teeth of the rack to cause said rack to be held at all times in engagement with the teeth on the pinion.

BURTON M. KENT.

In presence of—
L. HEISLAR,
R. SCHAEFER.